(12) United States Patent
Fujii et al.

(10) Patent No.: US 7,839,033 B2
(45) Date of Patent: Nov. 23, 2010

(54) BRUSHLESS DC MOTOR AND MANUFACTURING METHOD THEREOF

(75) Inventors: Tatsuhisa Fujii, Kyoto (JP); Tomotaka Yonemitsu, Kyoto (JP); Norihide Watari, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 12/576,302

(22) Filed: Oct. 9, 2009

(65) Prior Publication Data
US 2010/0019627 A1    Jan. 28, 2010

Related U.S. Application Data

(62) Division of application No. 11/533,822, filed on Sep. 21, 2006, now Pat. No. 7,622,834.

(30) Foreign Application Priority Data

Sep. 22, 2005    (JP) ............................. 2005-275222
Sep. 12, 2006    (JP) ............................. 2006-247045

(51) Int. Cl.
H02K 11/00    (2006.01)
H02K 5/22     (2006.01)
H02P 6/00     (2006.01)

(52) U.S. Cl. .................. 310/68 R; 310/71; 310/DIG. 6

(58) Field of Classification Search .............. 310/68 R, 310/71, DIG. 6; 361/679.4
See application file for complete search history.

(56) References Cited

U.S. PATENT DOCUMENTS

| | | | | |
|---|---|---|---|---|
| 4,156,170 A * | 5/1979 | Strunc | ......................... | 318/696 |
| 4,568,866 A * | 2/1986 | Floro et al. | ................. | 318/696 |
| 4,683,550 A * | 7/1987 | Jindrick et al. | .............. | 708/140 |
| 4,773,828 A * | 9/1988 | Hagiwara et al. | ........... | 417/354 |
| 4,779,031 A * | 10/1988 | Arends et al. | ................ | 318/565 |
| 4,972,470 A * | 11/1990 | Farago | ........................ | 713/192 |
| 5,572,384 A * | 11/1996 | Kumagai et al. | .......... | 360/99.08 |
| 5,925,948 A * | 7/1999 | Matsumoto | ................ | 310/67 R |
| 5,991,530 A * | 11/1999 | Okada et al. | ................... | 703/25 |
| 6,394,768 B1 * | 5/2002 | Fukuda et al. | .......... | 417/423.15 |
| 6,401,163 B1 * | 6/2002 | Kondo et al. | ................. | 711/100 |
| 6,611,117 B1 * | 8/2003 | Hardt | ..................... | 318/400.22 |
| 6,841,957 B2 * | 1/2005 | Brown | .................... | 318/400.01 |
| 6,944,906 B2 * | 9/2005 | Moein et al. | ................ | 15/250.3 |
| 6,992,885 B2 * | 1/2006 | Wang | ..................... | 361/679.33 |

(Continued)

OTHER PUBLICATIONS

Fujii; "Brushless DC Motor and Manufacturing Method Thereof"; U.S. Appl. No. 11/533,822; filed Sep. 21, 2006.

*Primary Examiner*—Burton Mullins
(74) *Attorney, Agent, or Firm*—Keating & Bennett, LLP

(57) ABSTRACT

A brushless DC motor includes an embedded memory of a micro computer mounted on a circuit board which can be modified during and/or after a manufacturing process of the brushless DC motor. The circuit board installed on the brushless DC motor includes an IC having the embedded micro computer executing feed back control of the pulse wide modulation and the embedded memory for storing data such as control programs. The circuit board also includes a writing terminal port to which an external memory writer is to be connected. Data is transferred from the external memory writer and stored in the embedded memory by contacting the writing terminal port with a tip end portion of a cable from the external memory writer.

13 Claims, 18 Drawing Sheets

U.S. PATENT DOCUMENTS 7,053,583 B1 * 5/2006 Hazelton ............... 318/400.03
7,358,631 B2 * 4/2008 Morishitahara ............. 310/71
2004/0015631 A1 * 1/2004 Kwong et al. ............... 710/302

* cited by examiner

BRUSHLESS DC MOTOR AND MANUFACTURING METHOD THEREOF

BACKGROUND OF THE INVENTION

1. Field of the Invention

The present invention generally relates to a brushless DC motor, and more particularly relates to a brushless DC motor which includes a rotation-control portion for controlling the rotation of the motor based on data stored in memory and a driving circuit for providing driving current controlled by the rotation-control portion.

2. Description of the Related Art

Brushless DC motors are used for various applications such as office electronics, home electronics, and car electronics. In some applications, the rotation of such brushless DC motors needs to be controlled with great accuracy.

The rotation-control portion of the brushless DC motor may be equipped with an IC having an integrated micro computer. Generally, the micro computers have embedded memories, and the micro computer used for the rotation-control portion includes a control program which regulates the driving current supplied to a stator based on a rotational state of the motor, temperature, and external signals. The rotation of the motor including such a rotation-control portion can be more sophisticatedly controlled compared to motors without such control portions.

Conventionally, a read-only nonvolatile memory (ROM) is used for the embedded memory of the micro computer. The control program such as a feedback control program is stored in the ROM of the micro computer. Then, the micro computer with the ROM is mounted on a circuit board which is to be installed onto the brushless DC motor.

The rotational setting of such a brushless DC motor can be variously modified by modifying the control program installed in the ROM.

Generally, two kinds of memories are used for the embedded memories of the micro computers; a one time programmable read only memory (an OTP-ROM) and an electrically erasable programmable ROM (an EEP-ROM or a flash memory). The OTP-ROM is inexpensive compared to the flash memory, therefore the micro computer with the OTP-ROM (OTP micro computer) is generally used for products in mass-production. However, when the design or configuration of the product is changed, the OTP micro computer on the motor needs to be replaced because the program stored on the OTP-ROM cannot be modified. If the micro computer has been already mounted on the circuit board, or the circuit board with the micro computer has been already installed onto the motor, replacing the micro computer will be a burdensome and time-consuming task, which greatly affects the efficiency of manufacturing the motor. Moreover, the replaced OTP micro computer needs to be discarded or stored so as to reuse them for other product models, which makes the efficiency of manufacturing the motor even less. The OTP micro computer is inexpensive itself, but as a result of the burdensome and time-consuming task mentioned above, the conventional brushless DC motor with the OTP micro computer is expensive and requires more time for its production.

In designing the control portion of the motor, ROM data of the motor is frequently required, and the brushless DC motor equipped with the micro computer in which access to the embedded memory of the micro computer during or after the manufacturing thereof is in demand. However, the circuit board is generally attached to the inside of the brushless DC motor, and it is generally inaccessible from outside of the motor.

SUMMARY OF THE INVENTION

In order to overcome the problems described above, preferred embodiments of the present invention provide a brushless DC motor in which an embedded memory of a micro computer mounted on the circuit board can be modified during and/or after the manufacturing process.

According to one preferred embodiment of the present invention, a brushless DC motor includes a rotor portion rotatable about a center axis and including a magnet, a stationary portion including an armature facing the magnet and formed by winding a wire around a stator core, a bearing rotatably supporting the rotor portion relative to the stationary portion, a circuit board connected to and facing the armature, a rotation control portion provided on the circuit board and including a non-volatile rewritable memory for controlling the rotation of the rotor portion based on data stored on the non-volatile rewritable memory, a driving circuit provided on the circuit board for providing driving current controlled by the rotation-control portion, and a writing terminal port provided on the circuit board to which an external memory writer is detachably connected.

According to another preferred embodiment of the present invention, the motor further includes an impeller arranged on the rotor portion; a bearing housing having a hollow cylindrical shape, an inside of which supports the bearing and an outside of which supports the armature; a base portion extending radially outwardly from the bearing housing; a housing surrounding the impeller and defining a passage of air flow; and a supporting arm supporting the base portion relative to the housing by connecting the housing and the base portion. The circuit board is arranged axially between the armature and the base portion.

According to another preferred embodiment of the present invention, the writing terminal port is arranged on a base-portion-side surface of the circuit board facing the base portion, the base portion includes a writing opening, and the external memory writer is detachably connected to the writing terminal port via the writing opening. By virtue of this configuration, the settings or design of the motor may be modified without replacing the already installed circuit board.

Generally, a portion of the circuit board is exposed by detaching the rotor portion of the motor. Therefore, the circuit of the motor is generally accessible from the rotor side (the armature side) of the circuit board. In another preferred embodiment of the present invention, the writing terminal port is arranged on the armature side of the circuit board, and the writing terminal port is accessible from the armature side of the circuit board even if it is not accessible from the base side of the circuit board, which makes it possible to write data in the memory after and/or during the manufacturing of the motor. In addition, settings of the motor are easily modified after manufacturing the motor without changing the hardware configuration. Therefore, it is not necessary to discard or store the replaced circuit board and/or electric components such as micro computers to reuse them, and it makes manufacturing of the motor more efficient.

According to another preferred embodiment of the present invention, a circuit board of the motor may include a protruding portion which protrudes from a base portion of the motor, and the writing terminal port may be arranged on the protruding portion. According to another preferred embodiment of the present invention, a circuit board of the motor may include a writing terminal port on its side surface. According to another preferred embodiment of the present invention, an external writing terminal port which is connected to the writing terminal port by an auxiliary cable is provided.

By virtue of the configurations mentioned above, the writing terminal port arranged on the circuit board is easily accessible during and/or after manufacturing of the motor. Therefore, the data stored in the memory is easily modified, and data such as rotational settings of the fan can be modified without changing the hardware configuration. In addition, it is not necessary to discard or store the replaced circuit board and/or electric components such as micro computers to reuse them, and it makes manufacturing of the fan more efficient.

A method of manufacturing the fan equipped with the motor is also provided. According to preferred embodiments of the present invention, the manufacturing method includes a data-writing step in which predetermined data is written in the memory of the fan by connecting the circuit board and a cable connected to an external memory writer. In the data-writing step, a tip end of the cable is contacted to the writing terminal port from an armature side of the circuit board.

Moreover, the data-writing step may be performed after connecting the circuit board and the armature then fixing the armature to the base portion. Furthermore, the manufacturing method may further include an inspection step in which the rotation of the fan is inspected, a detaching step in which a rotor portion is detached, and the data-writing step. The rotor portion of the fan identified as a defect fan during the inspection step is detached and the data-writing step is performed again.

Other features, elements, steps, processes, characteristics and advantages of the present invention will become more apparent from the following detailed description of preferred embodiments of the present invention with reference to the attached drawings.

DETAILED DESCRIPTION OF PREFERRED EMBODIMENTS

Referring to FIGS. 1 to 17, preferred embodiments of the present invention will be described in detail, in which a brushless DC motor is used as a motor of an axial fan for cooling a computer. In the following description, an axial direction indicates a longitudinal direction of a rotation axis, and a radial direction indicates a direction perpendicular to the center axis of the rotation of the brushless DC motor.

First Preferred Embodiment

Figure 1:
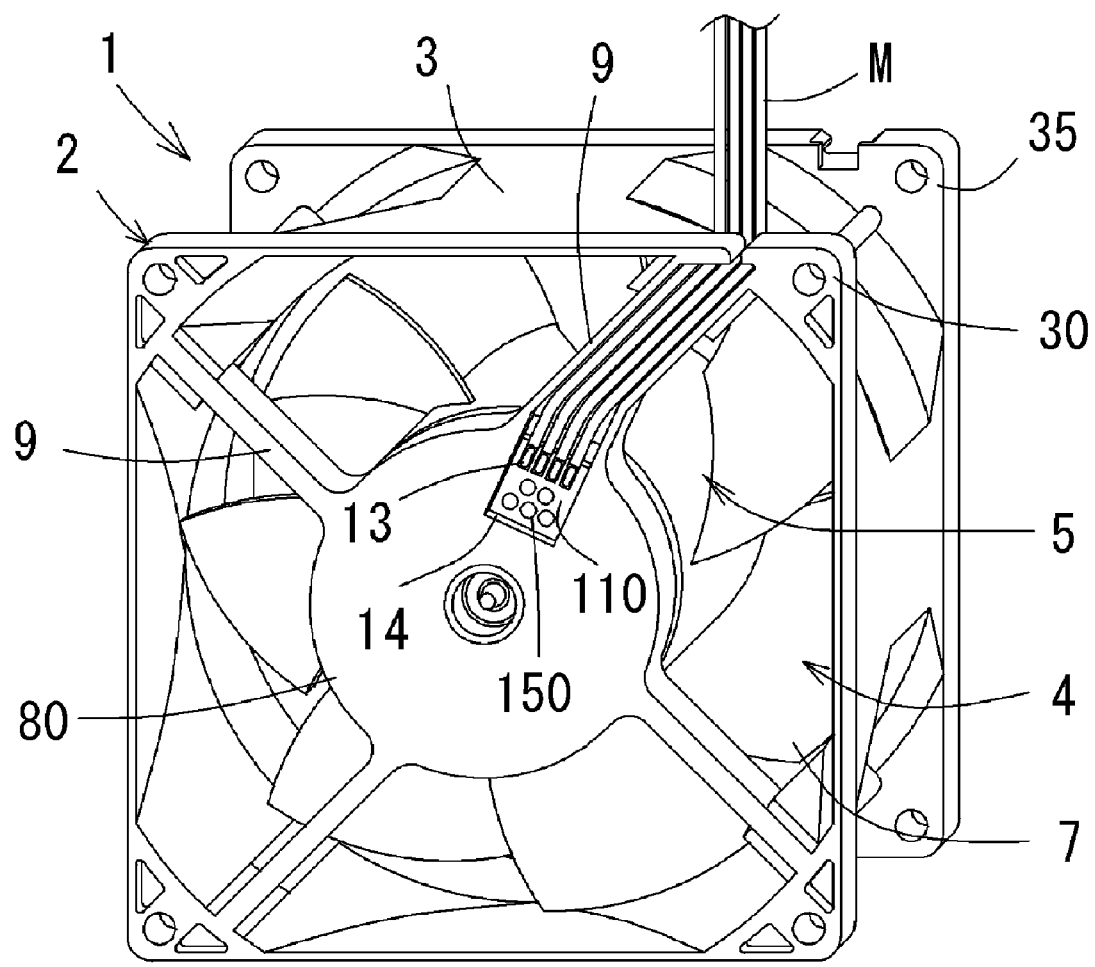
FIG. 1 is a perspective view of an axial fan according to a first preferred embodiment of the present invention.
Figure 2:
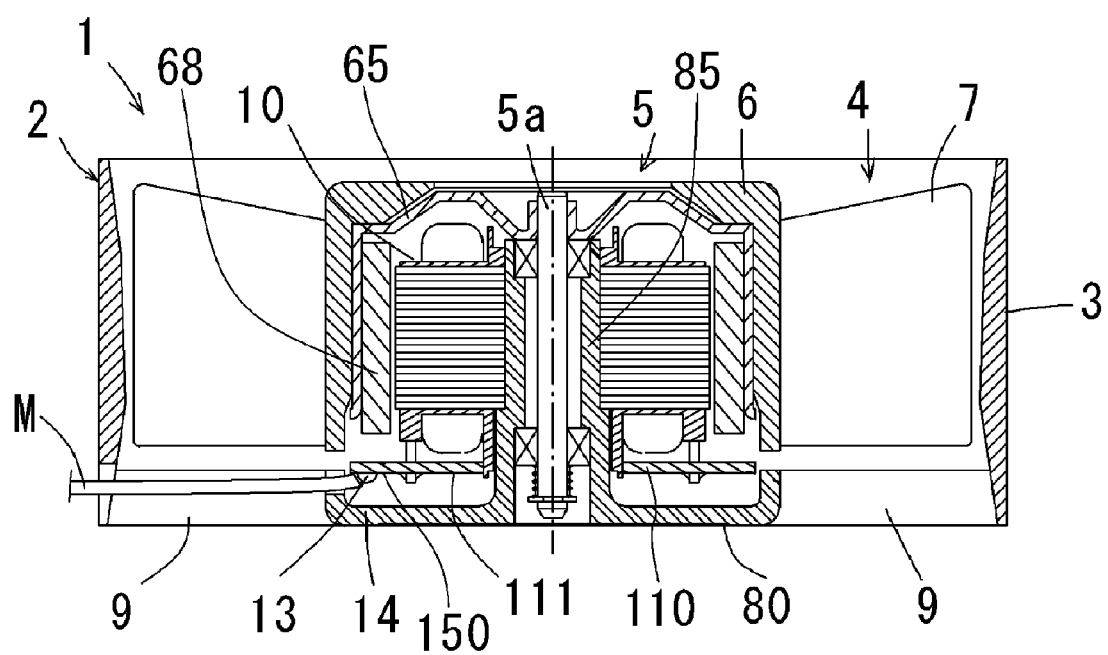
FIG. 2 is a cross sectional view of the axial fan shown in FIG. 1.
Figure 3:
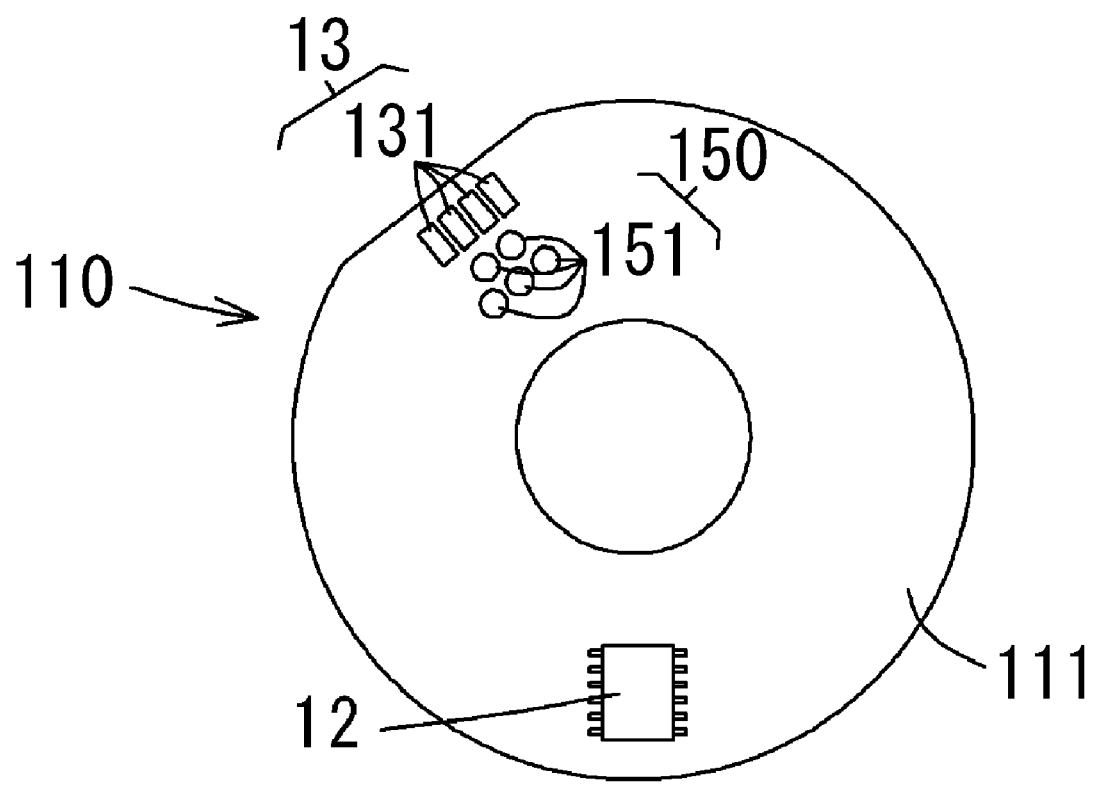
FIG. 3 is a plan view of a circuit board installed onto the axial fan.
Figure 4:
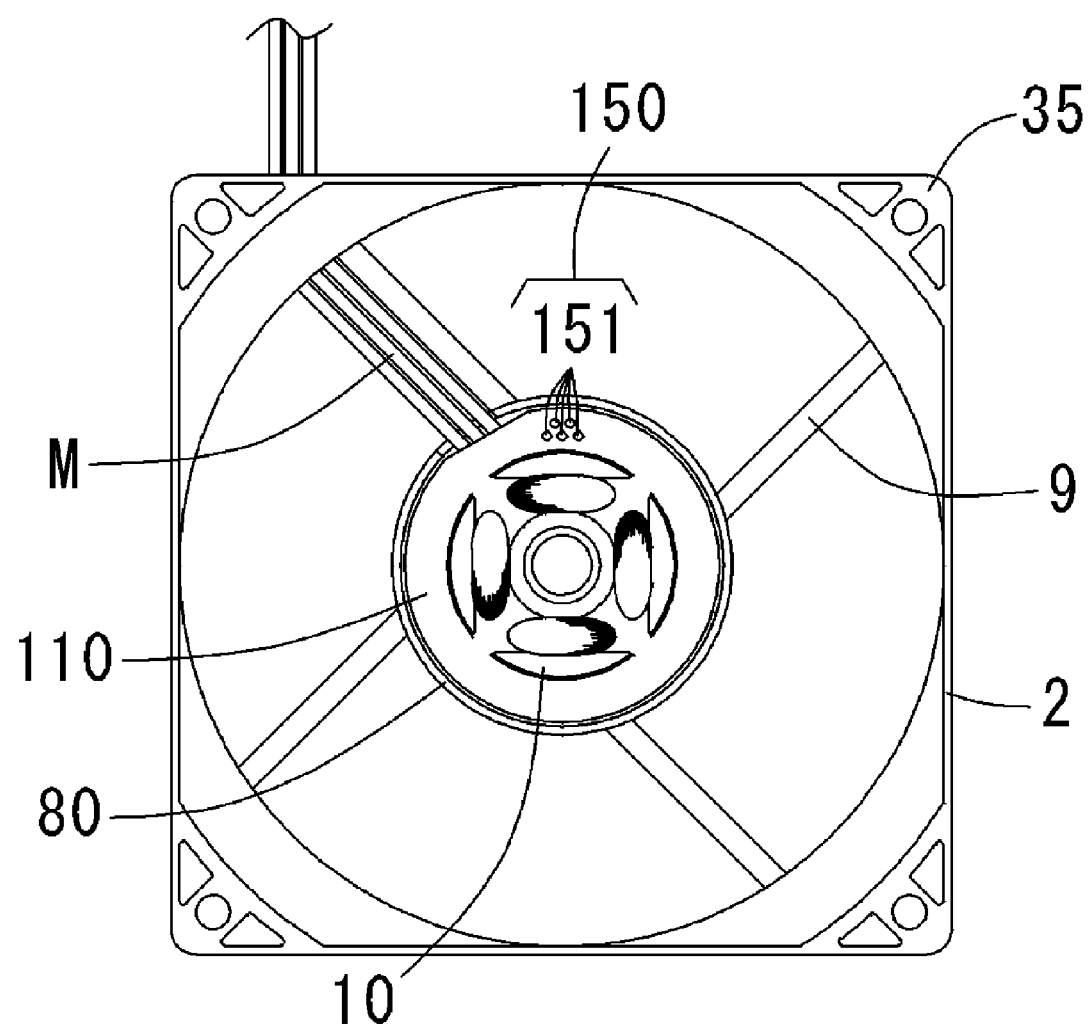
FIG. 4 is a plan view of the axial fan according to a second preferred embodiment of the present invention in the state that an impeller assembly thereof is detached.

Referring to FIGS. 1 to 3, the first preferred embodiment of the present invention will be described below.

An axial fan 1 shown in FIG. 1 includes a motor (brushless DC motor), an impeller 4 attached to the motor, and a housing 2 supporting the motor and arranged so as to radially surround the impeller 4. The housing 2 is defined by a hollow cylindrical body 3, an upper flange portion 30, a bottom flange portion 35, a base portion 80, and a plurality of supporting arms 9 which are integrally formed into a single member preferably made of synthetic resin, for example. The hollow cylindrical body 3 radially surrounds the impeller 4. The upper flange portion 30 is arranged radially outside of an upper opening of the hollow cylindrical body, and the bottom flange portion 35 is arranged radially outside of a bottom opening. The base portion 80 supports the motor and the impeller 4 at an inside of the hollow cylindrical body 3. The plurality of supporting arms 9 radially extend from the base portion 80 to the hollow cylindrical body 3 so as to support the base portion 80. A space between the cylindrical body 3 and base portion 80 defines a passage for air flow. The air is taken from one end opening and is exhausted to the outside of the housing 2 through the space. The base portion 80 includes an outer circumferential wall axially extending toward impeller 4 whereby the base portion 80 is formed into a cup shape.

As shown in FIG. 2, the impeller 4 includes a cup-shaped motor case 6 and a plurality of blades 7 arranged at an outer circumferential surface of the motor case 6. A motor body 5 is inserted into the motor case 6 so that the motor case 6 is attached to a rotor portion of the motor. A cylindrical bearing housing 85 is arranged at a middle portion of the base portion 80. A pair of bearings is fixed within the bearing housing 85, and an armature 10 is fixed to the outside of the bearing housing 85. The pair of bearings rotationally support a rotational shaft 5a arranged in the middle portion of the impeller 4 whereby the impeller 4 is rotatably supported. A magnet 68 is fixed to the inside of the motor case 6 via a yoke 65 so that the magnet 68 faces the armature 10. The armature 10 includes a stator core formed by laminating Si-Steel plates. An insulating layer is provided on the stator core and a wire is wound around a portion of the stator core to form a coil thereon. In the motor according to this preferred embodiment of the present invention, a stationary portion of the motor is defined by the bearing housing 85 and the base portion 80, and the rotor portion is defined by the yoke 65 and the rotational shaft 5a.

Figure 18:
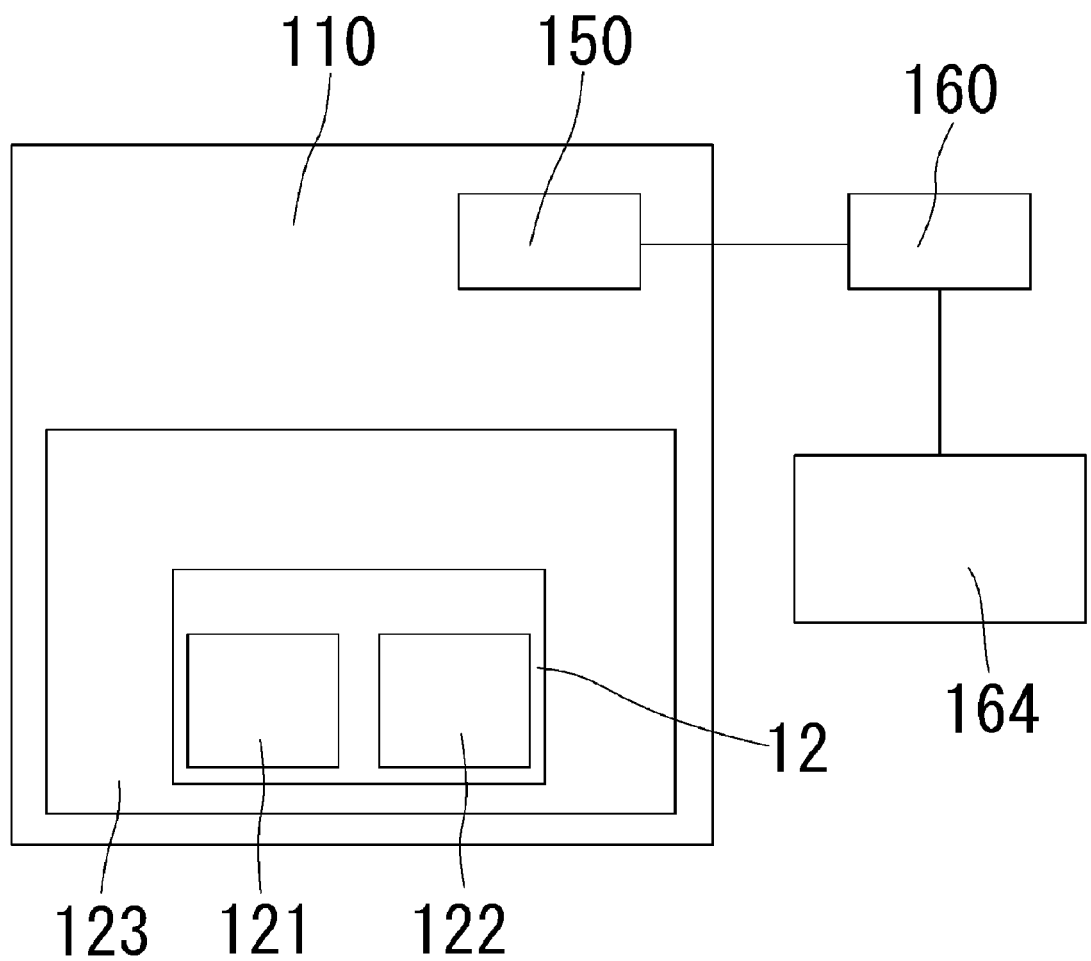
FIG. 18 is a block diagram of the relationship between the circuit board, driving circuit, micro-computer integrated circuit, writing terminal port, probe, and external memory writer.

A control portion of the motor body 5 includes a rewritable non-volatile memory (flash memory) 122, a rotation-control portion 121 for controlling the rotation of the motor based on the data stored in the memory, and a driving circuit 123 for providing driving current controlled by the rotation-control portion (each shown in FIG. 18). The control portion is configured so as to the execute feedback control of the pulse width modulation (PWM) by using a micro computer. To execute the feedback control, the circuit board 110 includes a micro-computer integrated circuit 12 (hereinafter simply referred to as IC 12) having an embedded micro computer, an embedded memory, such as the rewritable non-volatile memory 122, storing data, and a program for the feedback control that defines the rotation-control portion 121.

As shown in FIG. 3, the circuit board 110 is in a substantially annular shape having a center opening to which the bearing housing 85 of the base portion 80 in inserted. An outer diameter of the circuit board 110 is substantially the same as an internal diameter of the outer circumferential wall of the base portion 80. A circuit pattern is printed on both sides of the circuit board 110, and electronic components including the IC 12 are mounted on one side 111 of the circuit board 110, wherein the one side 111 is facing toward the base portion 80. FIG. 3 shows a portion of the circuit pattern and the components. The circuit board 110 is fixed to the armature 10 by soldering a plurality of connection pins provided on an insulator of the armature 10 to the circuit board 110. The coil is connected to the connection pins whereby the coil and the circuit board 110 are electrically connected via the connection pins.

An external connection port 13 including a plurality of terminal pins 131 is arranged at an outer circumferential portion of a base portion side 111 of the circuit board 110. One end of a cable M is soldered to the external connection port 13, and another end of which is connected to external power supply and/or the external control circuit. As shown in FIG. 1, the base portion 80 includes a wiring opening 14 and a guide groove arranged on one of the supporting arms 9, through which the cable M connected to terminal pins 131 is led outside of the housing 2.

As shown in FIG. 2, the circuit board 110 is accommodated in the substantially cup-shaped base portion 80 and includes the control portion having IC 12 on one side 111 thereof which faces the base portion 80. Also on side 111 of the circuit board which faces the base portion 80, a writing terminal port 150 to write data in the embedded memory of the IC 12 is provided.

In this preferred embodiment of the present invention, the writing terminal port 150 is preferably defined by five terminal pins 151, which are connected to the embedded memory through circuit patterns (not shown in the drawings). By connecting the writing terminal port 150 and an external memory writer 164 (shown in FIG. 18) with a control cable, it becomes possible to write data to the embedded memory.

The procedure to modify data stored in the embedded memory of the IC 12 installed onto the axial fan 1 is described below. First, power supply for the axial fan 1 is shut off. Second, a probe 160, which is arranged on the tip end of the control cable extending from the external memory writer, is inserted into the wiring opening 14, and then the tip end of the probe 160 is connected to the write terminal port 150 (see FIG. 5). Third, by activating the external program writer, data stored in embedded memory of the IC 12 may be modified. After modifying data in the embedded memory, access to the memory is shut off to prevent the data stored in the memory from leaking out or being altered. For example, the wiring opening (the writing opening) may be closed by attaching a name plate to the base portion 80. Alternatively, a rectangular cap may be attached so as to close the wiring opening 14.

The writing terminal port 150 is arranged so as to face the wire opening 14. Therefore, like the external connection port 13, the writing terminal port 150 is exposed to the outside of the axial fan 1 through the wire opening 14. In other words, in this preferred embodiment of the present invention, the wiring opening 14 is also used as a writing opening whereby it is not necessary to provide the writing opening separately. By virtue of the configuration in which the opening area of the base portion 80 is reduced, the rigidity of the base portion 80 is maintained.

Figure 5:
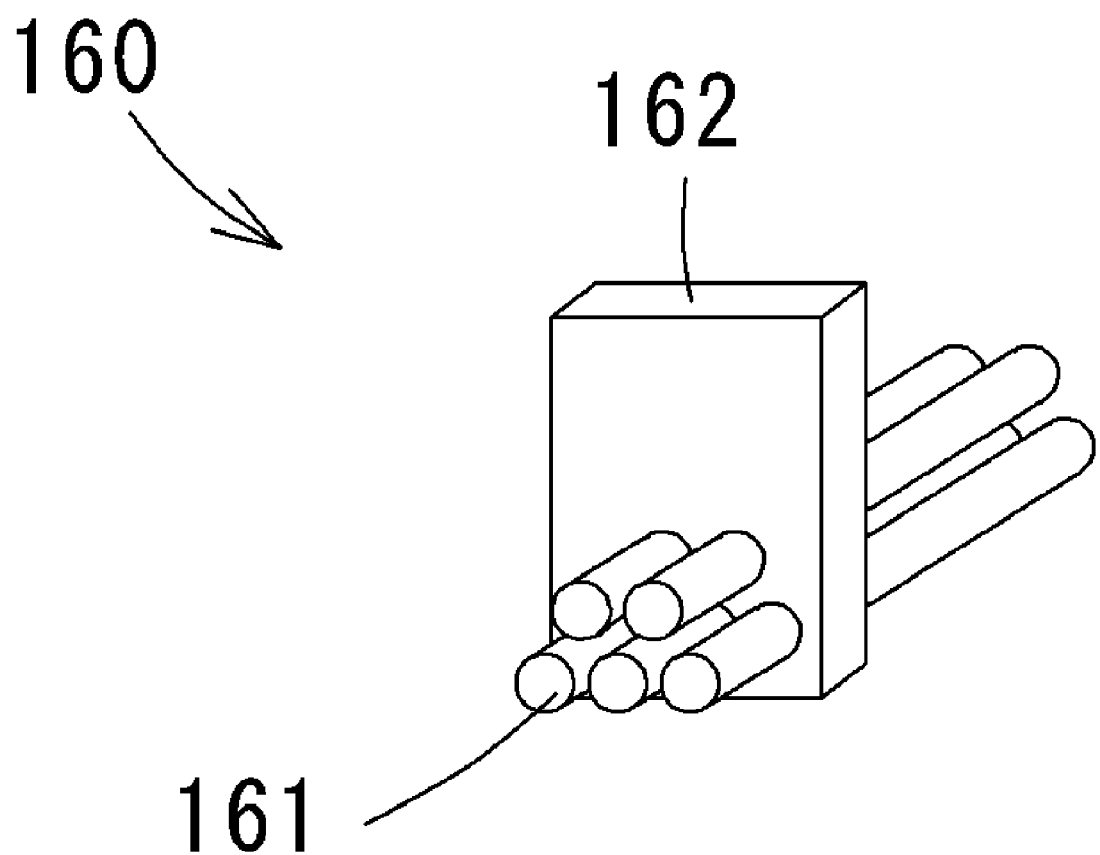
FIG. 5 shows a probe (a connector of a control cable) which is a portion of an external device for writing data in an embedded memory of a micro computer mounted on the axial fan.

As shown in FIG. 5, the tip portion of the probe 160 includes a rectangular portion 162 whose shape is the same as that of the wiring opening 14. The distance from the tip end of the probe 160 to rectangular portion 162 is substantially the same as that from the writing terminal port 150 to the wiring opening 14. With the configuration mentioned above, five terminal pins 161 and the writing terminal port 150 are aligned and electrically connected by inserting the rectangular portion 162 of the probe 160 into the wiring opening 14. Alternatively, the terminal pins 161 and the wiring opening 14 may be aligned by just aligning edge or side portions of wiring opening 14 and the rectangular portion 162.

Second Preferred Embodiment

Referring to FIGS. 4, 12, 15, and 16, the second preferred embodiment of the present invention will be described below. In this preferred embodiment of the present invention, the writing opening and/or wiring opening is not provided on the base portion, and the writing terminal portion is provided on an armature-side of the circuit board. The rest of the configuration of the axial fan 1 is similar to that explained in the first preferred embodiment, therefore detailed explanation will be omitted.

Figure 12:
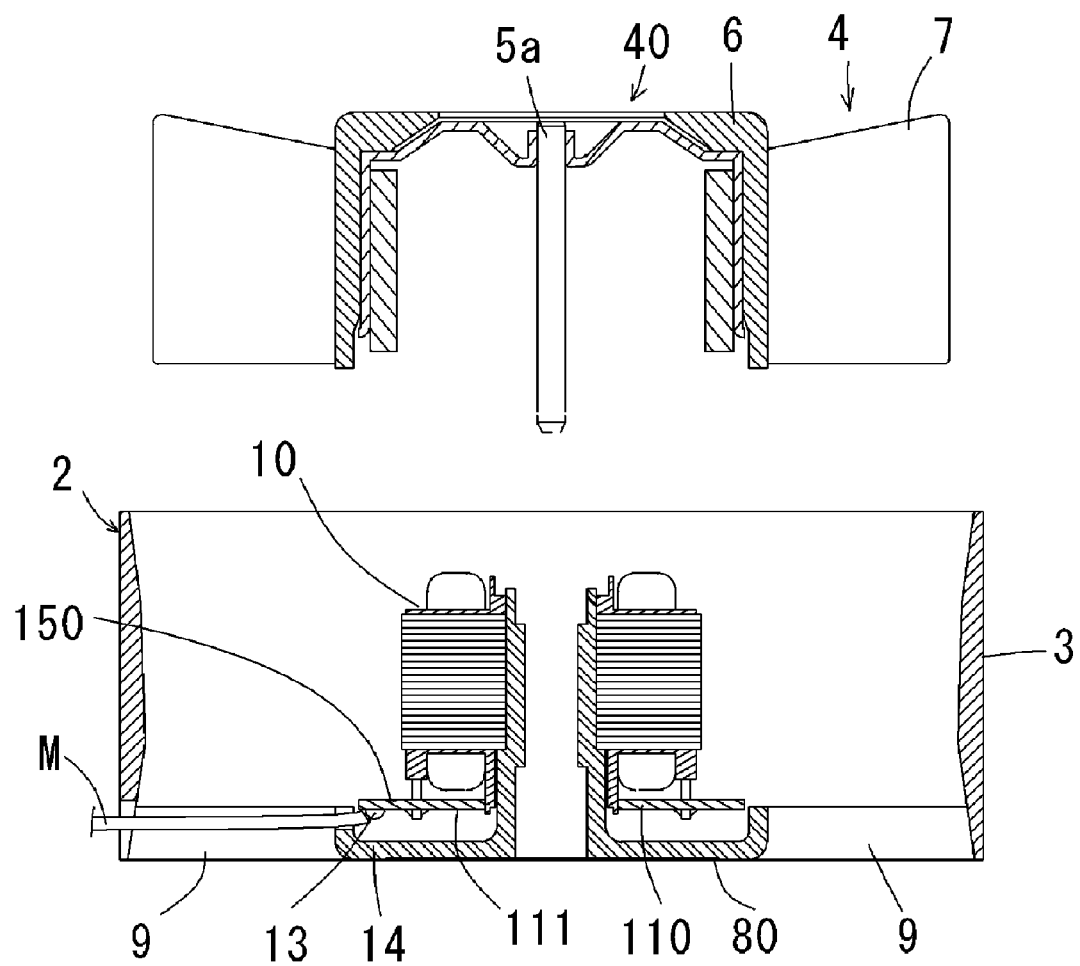
FIG. 12 shows a cross sectional view of the axial fan in the state that the impeller assembly thereof is detached.

The shaft 5a of the axial fan 1 is retained by attaching a wire ring, such as C rings, to a circular groove arranged on the tip of the shaft 5a. In other words, the shaft 5a is released by detaching the wire ring. Therefore, an impeller assembly 40 (rotor portion) of the axial fan 1, defined by the impeller 4, the magnet 68, the yoke 65, and the shaft 5a, is easily detached from the stationary portion as shown in FIG. 12. Moreover, the impeller assembly 40 is easily secured to the stationary portion by attaching the wire ring.

The procedure to write data in the embedded memory of the IC 12 installed onto the axial fan 1 is described below. First, power supply for the axial fan 1 is shut off. Second, in the state the impeller assembly 40 is detached from the axial fan 1, the probe 160 of the control cable of the external memory writer is inserted into the housing 2 from one end side of the housing (the armature 10 side relative to the circuit board 110), and then the tip end of the probe 160 is connected to the write terminal port 150. Third, by activating the external program writer, data stored in the embedded memory of the IC 12 may be modified. After writing data to the embedded memory, access to the memory is shut off to prevent the data stored in the memory from leaking out or being altered.

In this preferred embodiment of the present invention, the circuit board 110 is substantially axially covered by the base portion 80. By virtue of the configuration mentioned above, the probe 160 cannot be connected to the circuit board 110 from the base side as long as a through hole or a notch portion is not provided on the cover portion 80. Therefore, a data-writing step is performed in the state that the impeller assembly 40 is not attached to the stationary portion.

Figure 15:
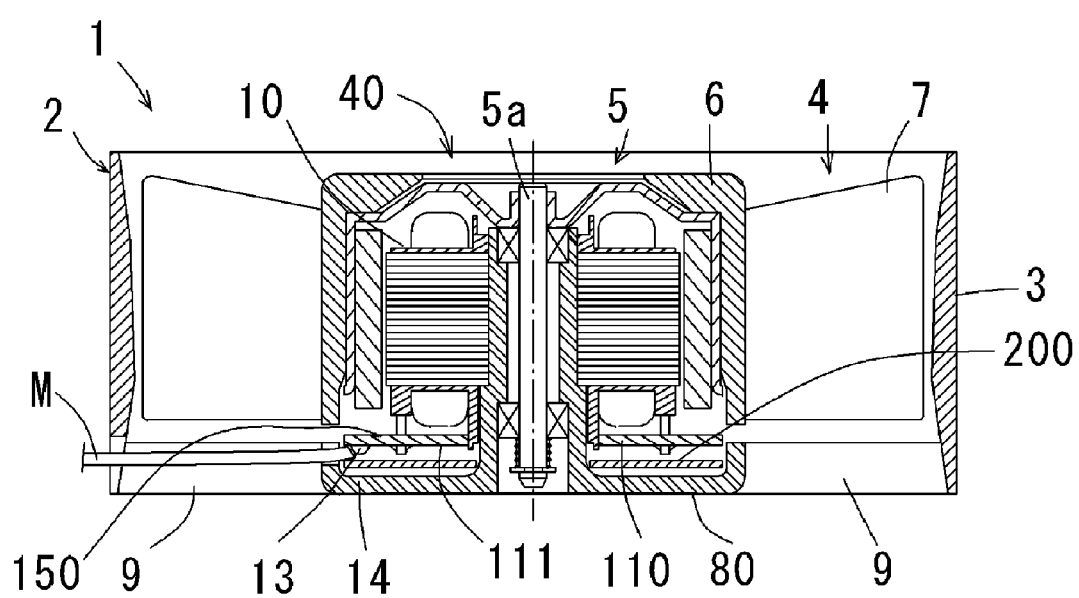
FIG. 15 shows a perspective view of the axial fan according to a modification of the second preferred embodiment of the present invention.

As another example, as shown in FIG. 15, a modification of the second preferred embodiment of the present invention is preferably applied to a brushless DC motor in which an insulating material 200 is arranged between the circuit board 110 and the base portion 80. The brushless DC motor having a housing 2 defined by a conductive material (such as die cast aluminum) includes the insulating material 200 between the circuit board 110 and the base portion 80. Therefore, the probe 160 is not connected to the circuit board from the base portion 80 side of the brushless DC motor.

Figure 16:
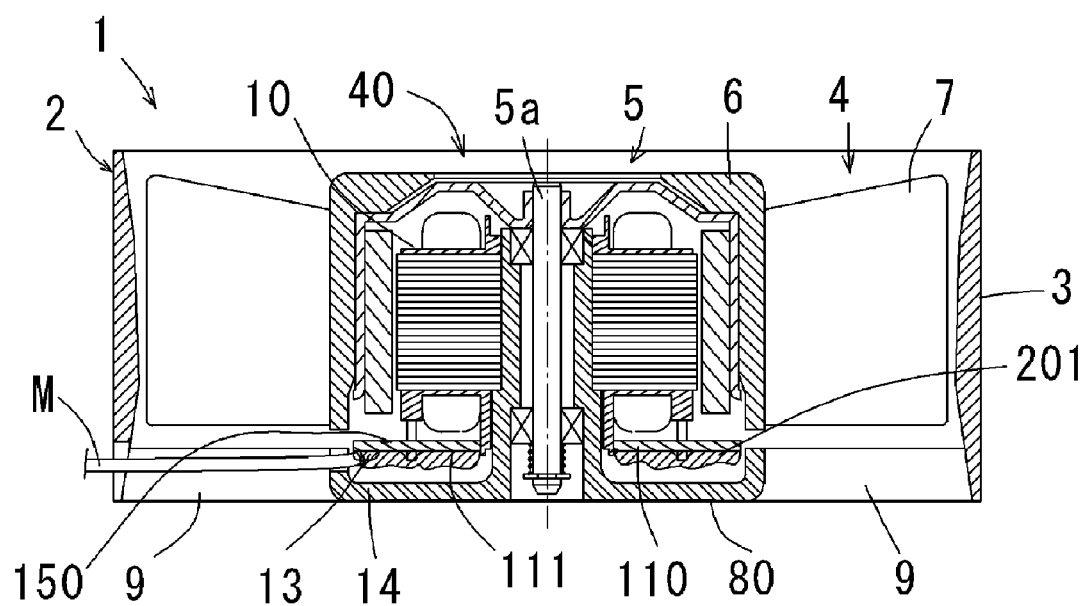
FIG. 16 shows a perspective view of the axial fan according to a modification of the second preferred embodiment of the present invention.

The axial fan 1 may be used under high-temperature and high-humidity conditions. In that case, as shown in FIG. 16, moisture proofing is applied to one surface of the circuit board 110 of the axial fan 1, on which electric components including IC 12 are mounted, by coating the surface 111 with a moisture proofing agent 201, such as a polyolefin, acryl, polyurethane, or silicon. Therefore, the one surface 111 (the base portion 80 side) of the circuit board is covered with the moisture proofing agent 201 and the probe 160 is not connected to the circuit board from the base portion 80 side.

Moreover, in the state that the impeller assembly 40 is not attached to the stationary portion, the armature 10 does not protrude axially above the writing terminal port 150. Therefore, the visibility of writing terminal portion 150 in the axial direction is properly maintained, and the data-writing step may be facilitated. In addition, because the visibility of the writing terminal port 150 in the axial direction is properly maintained, the probe 160 may contact the writing terminal port 150 by a linear action. Therefore, when the probe 160 is attached to automated machinery for assembling the axial fan according to the preferred embodiments of the present invention, it is possible to simplify the action of the automated machinery.

Third Preferred Embodiment

Figure 11:
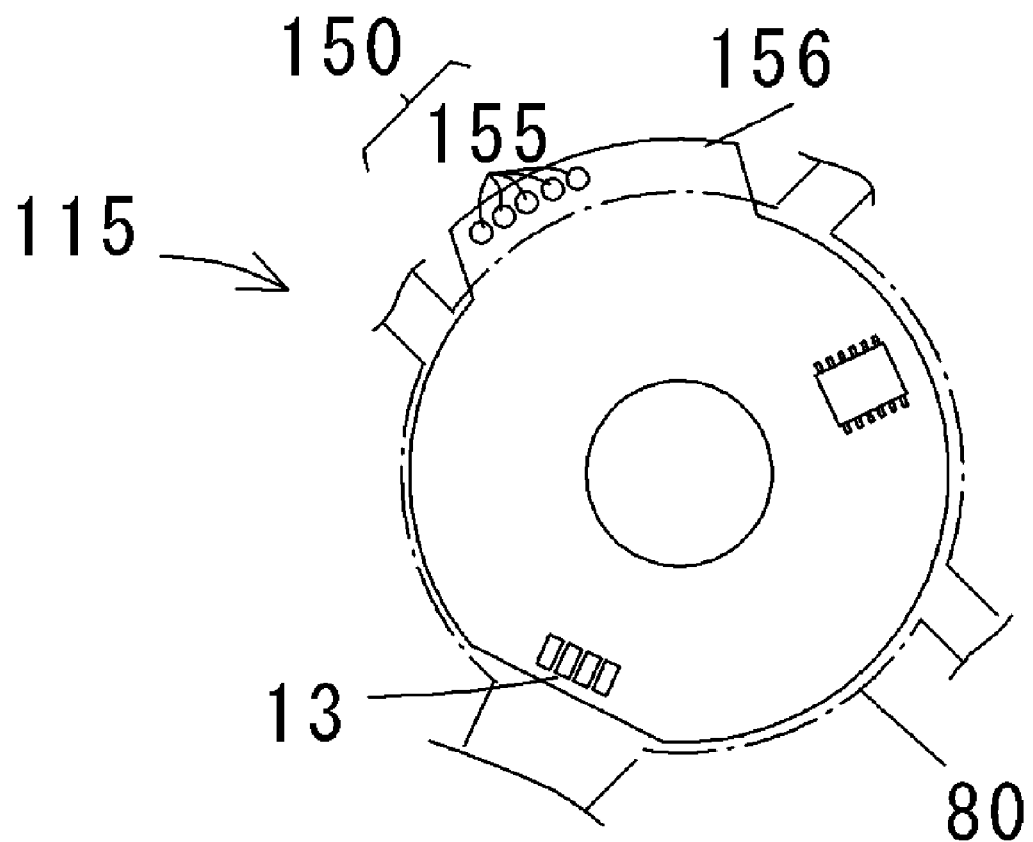
FIG. 11 is a plan view of a circuit board installed to the axial fan according to a third preferred embodiment of the present invention.

Referring to FIG. 11, the third preferred embodiment of the present invention will be described below. In this preferred embodiment of the present invention, the axial fan 1 includes a circuit board 115 instead of circuit board 110 shown in FIG. 3. The circuit board 115 has a protruding portion 156 which radially protrudes from the outer circumferential edge of the base portion 80. Moreover, the circuit board 115 includes terminal pins 155, defining the writing terminal port 150, on the protruding portion 156. In this configuration, a portion of the airflow passing through the hollow cylindrical body 3 is fed toward the center of the circuit board 115 to cool the electric components. In addition, a thermal sensor may be arranged on the protruding portion 156. By virtue of this configuration, visibility of the writing terminal port is further improved so that the connection between the writing terminal port 150 and the probe 160 is easily established.

Fourth Preferred Embodiment

Figure 17:
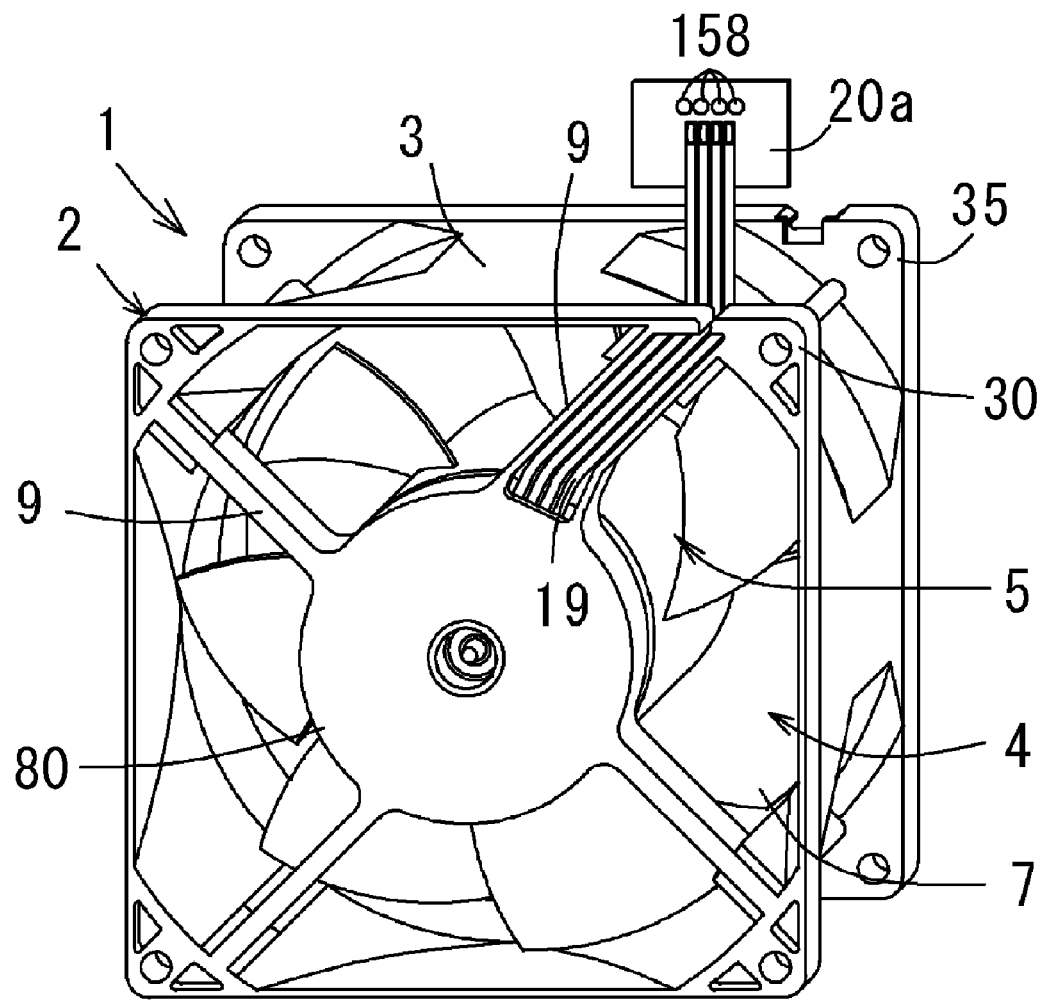
FIG. 17 is a perspective view of an axial fan according to a fourth preferred embodiment of the present invention.

Referring to FIG. 17, the fourth preferred embodiment of the present invention will be described below. In this preferred embodiment of the present invention, as shown in FIG. 17, the control cable is connected to the circuit board 110 or 115 via an auxiliary cable 19 so that the connection between the control cable and the circuit board is established without directly contacting each other (cable M is not shown in FIG. 17). In other words, one end of the auxiliary cable 19 is connected to the terminal pins of the writing terminal port 150 arranged on the circuit board 110 or 115, and another end of the auxiliary cable 19 is connected to an external circuit board 20a arranged outside of the housing 2. The external circuit board 20a includes an external writing terminal port defined by terminal pins 158, having a similar configuration and functions as the writing terminal port 150.

The external circuit board 20a may be fixed to a casing provided separately from the housing 2 so that the external circuit board 20a is attached to the housing 2 in a detachable manner. Alternatively, the external circuit board 20a may be attached to a device to which the axial fan 1 is to be installed. In addition, the casing may be used as a supporting member of the external circuit board 20a while writing data to the embedded memory of the micro computer. Alternatively, the external circuit board 20a may be directly attached to the exterior of the housing 2.

The auxiliary cable 19 may be also used as the cable M. In this case, a DIP switch may be provided on the axial fan 1. The DIP switch switches the connection of the cable M to the writing terminal port when the power supply is shut off. By virtue of this configuration, the number of cables outgoing from the axial fan 1 is reduced.

Writing Terminal Port

Figure 6:
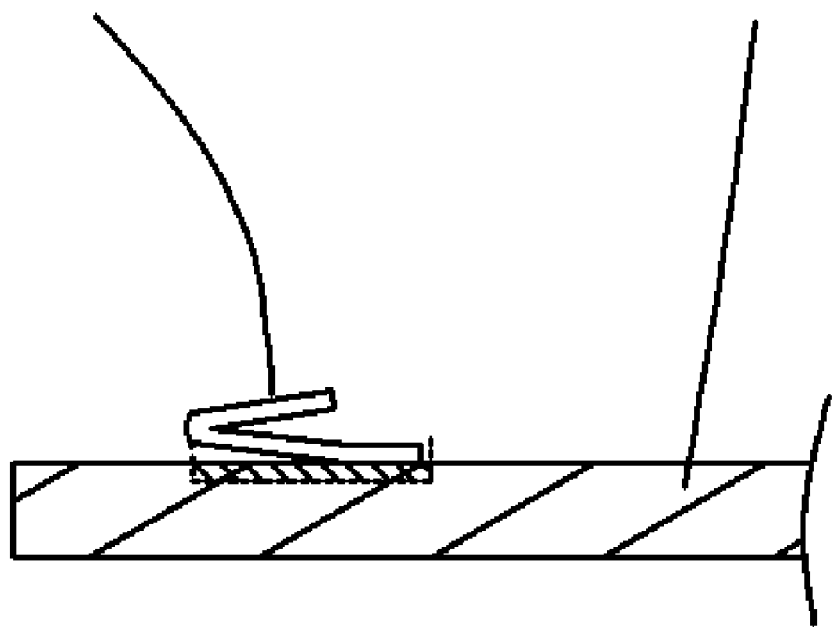
FIG. 6 shows a cross sectional view of the axial fan according to a modified preferred embodiment of the present invention.

Upon axially pressing the probe 160 to the writing terminal port 150, the circuit board 110 axially supports the writing terminal port 150 whereby the probe 160 and the writing terminal port 150 are securely connected. In case terminal pins 161 of the probe 16 are damaged by the pressure upon pressing the probe 160 to the writing terminal port 150, each of terminal pins 161 may be constructed to have elasticity. For example, as shown in FIG. 6, elastic terminal pins 152 may be provided on the writing terminal port 150.

Figure 7:
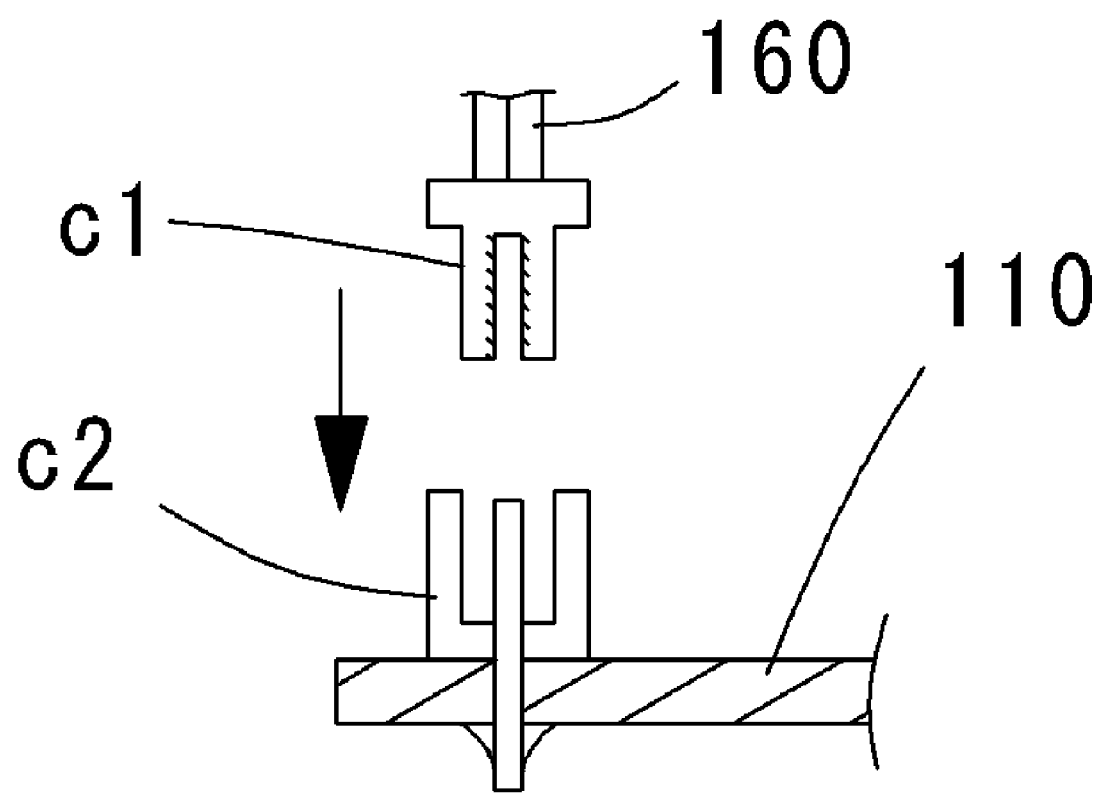
FIG. 7 shows a cross sectional view of the axial fan according to another modified preferred embodiment of the present invention.
Figure 8:
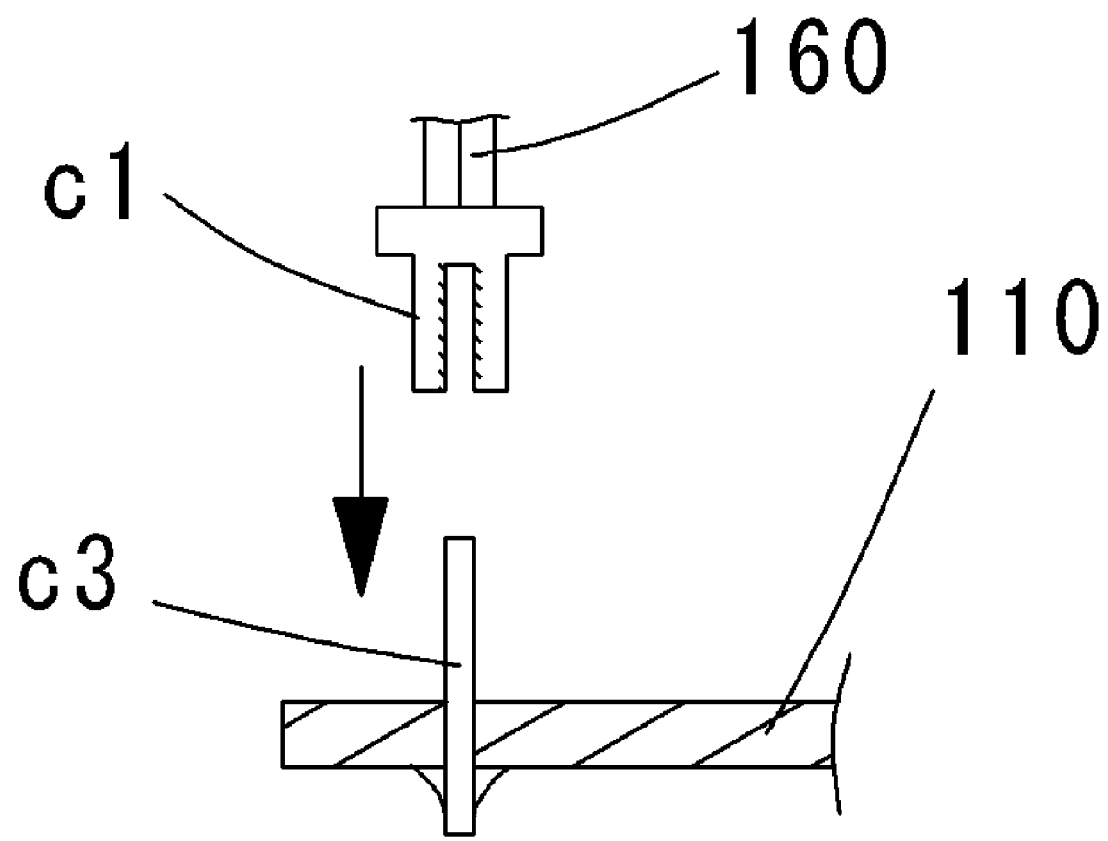
FIG. 8 shows a cross sectional view of the axial fan according to another modified preferred embodiment of the present invention.
Figure 9:
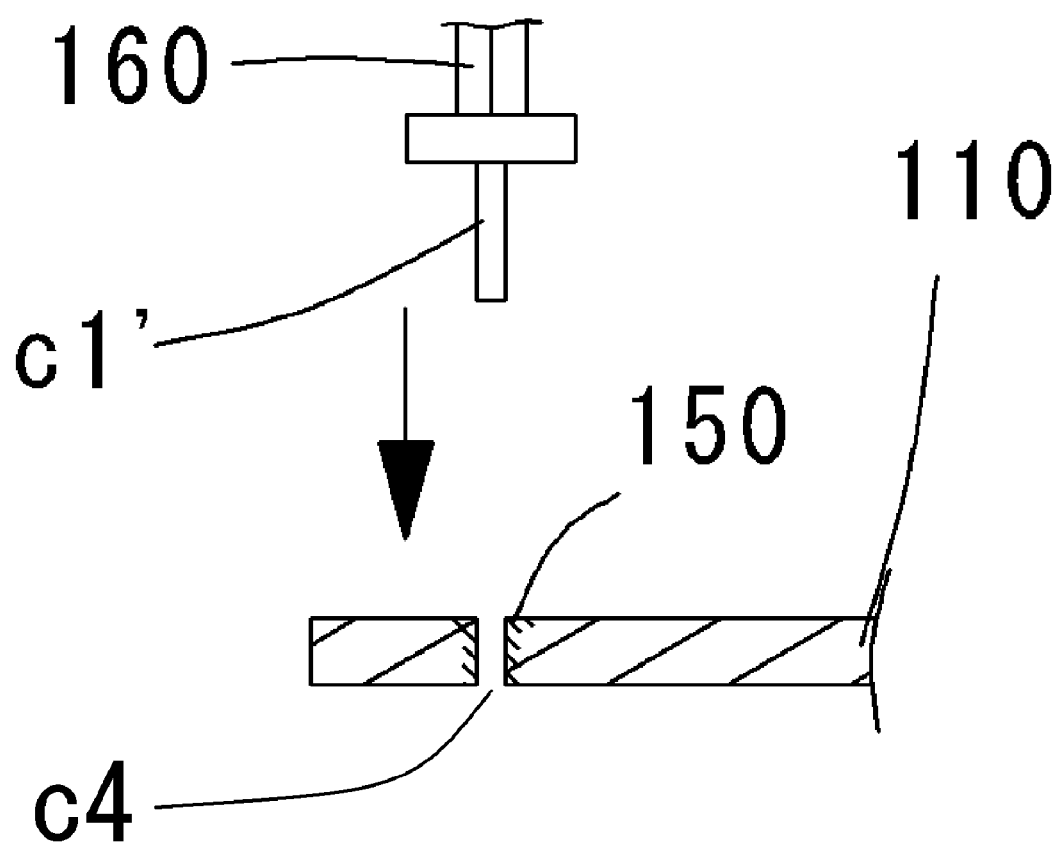
FIG. 9 shows a cross sectional view of the axial fan according to another modified preferred embodiment of the present invention.
Figure 10:
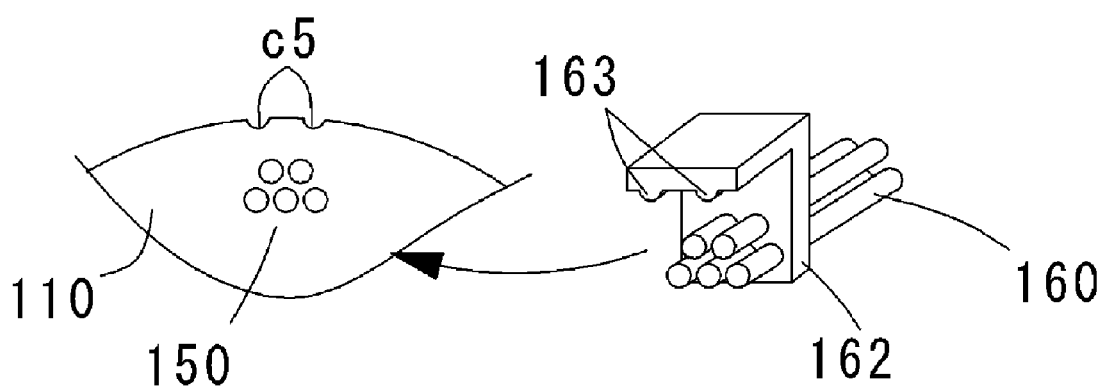
FIG. 10 shows a cross sectional view of the axial fan according to another modified preferred embodiment of the present invention.

In case the writing terminal port 150 and the probe 160 are not aligned properly, a data-writing error may occur. Therefore, to write data properly, the writing terminal port 150 and the probe 160 need to be properly aligned. For example, as shown in FIG. 7, connectors c1 and c2, arranged on the tip ends of the probe 160 and the writing terminal port 150 respectively, may be connected to each other to align the probe 160 and the writing terminal port 150. Alternatively, as shown in FIG. 8, a connector c3 arranged on the writing terminal port 150 and the connector c1 of the probe 160 may be connected to each other. Alternatively, as shown in FIG. 9, a through hole c4 may be provided on the circuit board 110 and a conductive portion may be provided on the inner peripheral surface of the circuit board 110 defining the through hole c4. Then the connector c1' may be inserted into the through hole C4. Alternatively, as shown in FIG. 10, a notch portion c5 provided on the circuit board 110 and a convex portion 163 provided on the rectangular portion 162 of the probe 160 may contact with each other to align the writing terminal port 150 and the probe 160. While examples of aligning the writing terminal port 150 and the probe 160 have been described in the foregoing, it is not limited to the examples described above, in that various modifications are possible.

According to the preferred embodiments of the present invention, the data stored in the embedded memory of the IC may be easily modified after the IC is installed onto the axial fan. Therefore, the settings or design of the axial fan 1 may be modified without replacing the already installed IC 12 and/or the circuit board 110. In other words, the data stored on the IC installed to the axial fan 1 can be modified in an efficient manner without high increased costs and/or time consuming procedures. Moreover, the data may be modified any number of times because the flash memory is used as the embedded memory of the IC.

Additionally, the axial fan may be completely assembled or partially assembled. The partially assembled axial fan includes, for example, the circuit board 110 on which the IC 12 is mounted; the assembly defined by the housing 2, the armature 10, the pair of bearings, and the circuit board 110; and the assembly defined by the armature 10 and the circuit board 110.

Manufacturing Method of the Axial Fan

Next, a manufacturing method of the axial fan is explained.

Figure 13:
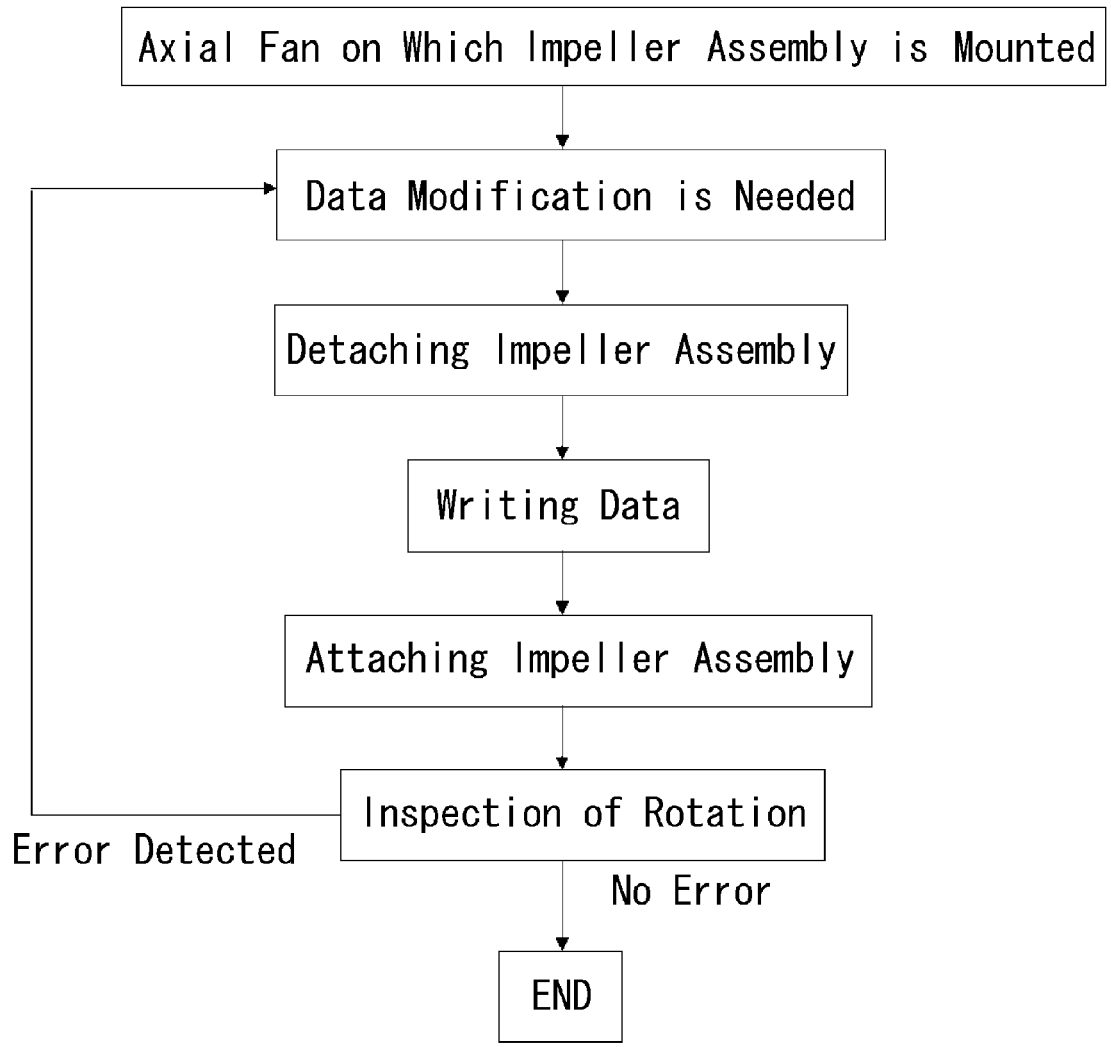
FIG. 13 is a flow chart illustrating a manufacturing method of the axial fan according to a preferred embodiment of the present invention.

In the case that the data is stored in the embedded memory of the IC 12 of the axial fan 1 just before the shipment thereof, the data is modified by the method as shown in FIG. 13.

First, the impeller assembly 40 is detached from the stationary portion. By detaching a C-ring arranged on the tip end portion of the shaft 5a, the shaft 5a becomes axially movable, whereby the impeller assembly 40 is detached from the stationary portion. By detaching the impeller assembly 40, the writing terminal port 150 arranged on the circuit board 110 is exposed. Subsequently, the probe 160 is electrically connected to the writing terminal port 150 and the data stored in the memory is modified. Then, the impeller assembly 40 is attached to the stationary portion and the rotation thereof is inspected in relation to the current waveform, the rotation speed, and so on. If an error is found in the axial fan, the impeller assembly 40 is detached and the data is transferred to the memory again.

Figure 14:
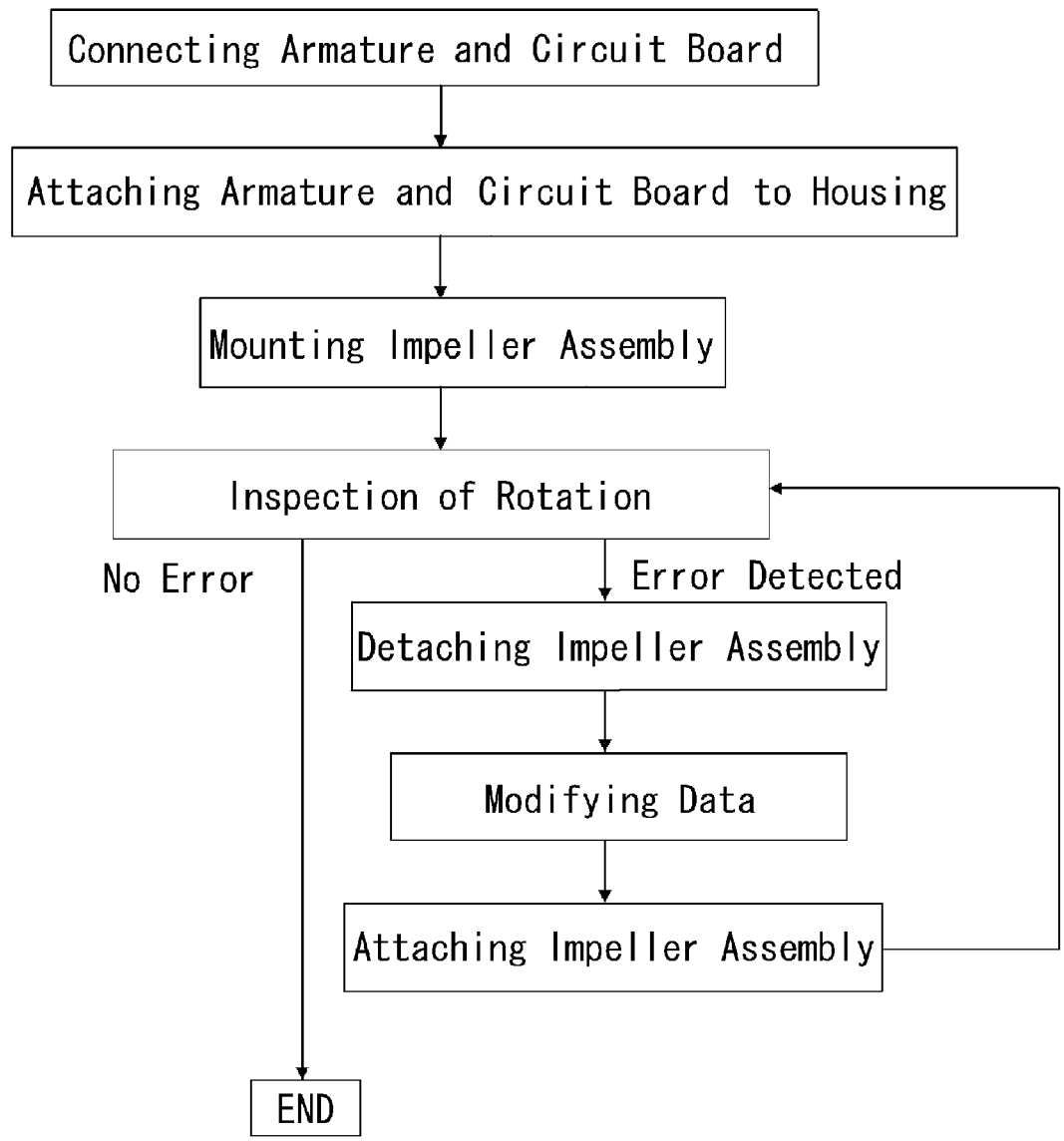
FIG. 14 is a flow chart illustrating a manufacturing method of the axial fan according to a preferred embodiment of the present invention.

Referring to FIG. 14, the manufacturing method of the axial fan 1 is described in detail with a focus on the data-writing step. In this preferred embodiment, the predetermined data relating to the rotation control has been already written in the embedded memory of the IC 12. Before writing data in the memory, the IC 12 is mounted to the circuit board 110. Therefore, the IC 12 with predetermined data mounted on the circuit board 110 is fed to the manufacturing process of the axial fan 1.

First, the circuit board 110 is electrically connected with the coil formed on the armature 10. Second, the circuit board 110 and the armature 10 electrically connected to each other are attached to the base portion 80 of the housing 2. The armature 10 is bonded to the outer circumferential surface of the bearing housing 85 arranged at the middle portion of the base portion 80 with, for example, adhesive. Therefore, the armature 10 and the circuit board 110 are not easily detached once the adhesive is hardened.

Third, the pair of ball bearings is fixed to the inside of the bearing housing 85, and the shaft 5a and a portion of the impeller assembly 40 is inserted into the pair of ball bearings such that the shaft 5a is rotatably supported via the bearings. Fourth, power is provided to the circuit board 10, and the rotation of the impeller assembly 40 is inspected. In this step, various factors, such as the rotation speed, waveform of the electric current flowing through the motor, the rotation speed of the impeller assembly 40 upon sending the control signal to the motor, etc. are inspected. Predetermined standards are given to such factors, and the motors which do not meet the standards are recognized as defective motors. Causes of the defects are, for example, writing error on the IC 12, writing false data on the IC 12, defects of the IC 12, and defects of the electric components other than IC 12. When a defective motor is found, the impeller assembly 40 of the defective motor is detached and data is written to the IC 12 again.

While preferred embodiments of the present invention have been described in the foregoing, the present invention is not limited to the preferred embodiments detailed above, in that various modifications are possible.

For example, the circuit board 110 or 115 may be any suitable circuit board, such as a flexible circuit board and a rigid circuit board made of metal, glass epoxy board, or paper impregnated phenol resin sheet.

Additionally, the writing terminal port may be arranged on an end surface of the circuit board, and the control cable from the external memory writer may be connected to the writing terminal port from the radial direction.

Additionally, the connection between the writing terminal port and the external memory writer may be established in a wireless manner. For example, a wireless signal receiver, such as an infra-red signal receiver, may be connected to the writing terminal port, and a wireless signal transmitter may be connected to the external memory writer.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A brushless DC motor comprising:
   a rotor portion rotatable about a center axis and including a magnet;
   a stationary portion including an armature facing the magnet, the armature including a wire wound around a stator core;
   a bearing rotatably supporting the rotor portion relative to the stationary portion;
   a base portion;
   a circuit board connected to and facing the armature;
   a rotation control portion provided on the circuit board and including a non-volatile rewritable memory arranged to control rotation of the rotor portion based on data stored in the non-volatile rewritable memory;
   a driving circuit provided on the circuit board and arranged to provide driving current controlled by the rotation control portion; and
   a writing terminal port provided on the circuit board and arranged to be detachably connected to an external memory writer; wherein
   the circuit board is axially arranged between the armature and the base portion; and
   the writing terminal port is arranged on a side of the circuit board facing the armature, and the writing terminal port is arranged radially outward relative to an outer side of the armature.

2. The brushless DC motor as set forth in claim 1, further comprising:
   an impeller arranged on the rotor portion to generate an air flow;
   a bearing housing having a hollow cylindrical shape, an inside of which supports the bearing and an outside of which supports the armature; and a housing surrounding the impeller and defining a passage for the air flow; wherein
the base portion extends radially outwardly from the bearing housing.

3. The brushless DC motor as set forth in claim 1, wherein a surface of the circuit board facing the base portion is substantially covered by the base portion.

4. The brushless DC motor as set forth in claim 3, wherein an insulating material is provided between the circuit board and the base portion, and the surface of the circuit board facing the base portion is substantially covered by the insulating material.

5. The brushless DC motor as set forth in claim 1, wherein an insulating material is provided between the circuit board and the base portion, and a surface of the circuit board facing the base portion is substantially covered by the insulating material.

6. The brushless DC motor as set forth in claim 1, wherein the circuit board includes a protruding portion which radially protrudes from the base portion, and the writing terminal port is arranged on the protruding portion.

7. The brushless DC motor as set forth in claim 1, further comprising an auxiliary cable, a first end of the auxiliary cable connected to the writing terminal port and a second end of the auxiliary cable connected to an external writing terminal port, and the external writing terminal port is arranged to be detachably connected to a control cable.

8. The brushless DC motor as set forth in claim 1, wherein the circuit board includes a connector on the writing terminal port, and a control cable from the external memory writer is detachably connected thereto.

9. The brushless DC motor as set forth in claim 1, wherein the circuit board includes a hole or a notch portion arranged to align the writing terminal port with a tip end portion of a control cable connected to the external memory writer.

10. The brushless DC motor as set forth in claim 1, wherein a wireless signal receiver is attached to the writing terminal port and the external memory writer is arranged to be connected to the circuit board in a wireless manner.

11. A manufacturing method of the brushless DC motor as set forth in claim 1, the method comprising the steps of:
a) electrically connecting the circuit board and the armature;
b) fixing the armature with the circuit board to the base portion; and
c) writing data such that data are transferred from the external memory writer and stored on the non-volatile rewritable memory provided on the circuit board by contacting the writing terminal port with a tip end portion of a cable from the external memory writer, wherein the tip end portion is contacted to the writing terminal port from an armature side of the motor relative to the circuit board.

12. A manufacturing method of the brushless DC motor as set forth in claim 1, the method comprising the steps of:
a) electrically connecting the circuit board and the armature;
b) fixing the armature including the circuit board to the base portion;
c) rotatably mounting a rotor portion to the stationary portion;
d) inspecting the rotation of the rotor portion;
e) detaching the rotor portion of the brushless DC motor when a defect is found in the inspecting step; and
f) writing data such that data are transferred from the external memory writer and stored on the non-volatile rewritable memory provided on the circuit board by contacting the writing terminal port with a tip end portion of a cable from the external memory writer, wherein the tip end portion is contacted to the writing terminal port from an armature side of the motor relative to the circuit board.

13. A manufacturing method of the brushless DC motor as set forth in claim 1, after the rotor portion is rotatably attached to the stationary portion, the method comprising the steps of:
a) detaching the rotor portion from the stationary portion;
b) writing data such that data are transferred from the external memory writer and stored on the non-volatile rewritable memory provided on the circuit board by contacting the writing terminal port with a tip end portion of a cable from the external memory writer, wherein the tip end portion is contacted to the writing terminal port from an armature side of the motor relative to the circuit board; and
c) rotatably mounting the rotor portion to the stationary portion.

* * * * *